United States Patent [19]
Argyres

[11] 3,768,675
[45] Oct. 30, 1973

[54] RETORT CRATE UNLOADING APPARATUS

[75] Inventor: George Argyres, San Leandro, Calif.

[73] Assignee: Gerber Products Company, Fremont, Mich.

[22] Filed: Dec. 3, 1971

[21] Appl. No.: 204,432

[52] U.S. Cl. ............ 214/310, 214/8.5 A, 214/8.5 F
[51] Int. Cl. ............................................. B65g 65/00
[58] Field of Search ............... 214/8.5 R, 8.5 A, 214/8.5 F, 152, 310; 198/24, 222

[56] References Cited
UNITED STATES PATENTS

| | | | |
|---|---|---|---|
| 3,072,273 | 1/1963 | Foster, Sr. et al. | 214/310 |
| 3,478,899 | 11/1969 | Pitchford et al. | 214/8.5 A |
| 3,643,823 | 2/1972 | Argyres et al. | 214/8.5 F |
| 3,265,223 | 8/1966 | Krupp | 214/8.5 A |

Primary Examiner—Gerald M. Forlenza
Assistant Examiner—Lawrence J. Oresky
Attorney—Stephen S. Townsend et al.

[57] ABSTRACT

Apparatus for unloading a retort crate having stacked, vertically shiftable layers of individual articles, such as glass jars or the like, wherein a convex article-engaging bail is shiftably mounted adjacent to a table top having a circular opening therethrough. The bail moves horizontally over the table to sweep the uppermost layer of articles of the retort crate laterally of the opening and onto a supporting surface adjacent thereto. The bail has substantially the same curvature as at least part of the outer boundary of the opening and, as the bail sweeps the uppermost articles off the crate, it moves into a location at which it positions a number of the articles in partially surrounding relationship to the opening. Thus, these last mentioned articles define abutments which serve to stabilize and prevent toppling of certain of the articles of the next layer to be swept off the stack.

8 Claims, 3 Drawing Figures

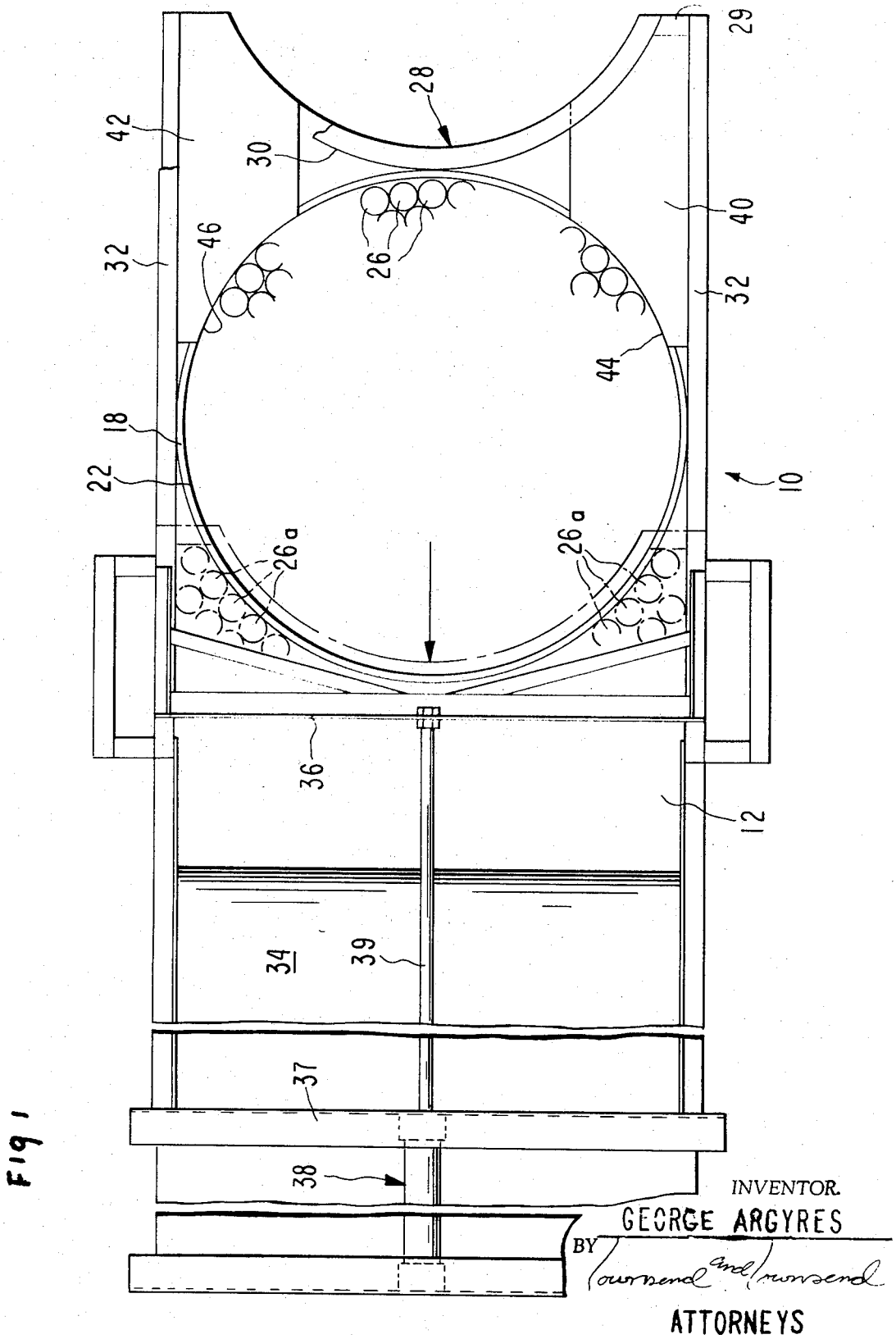

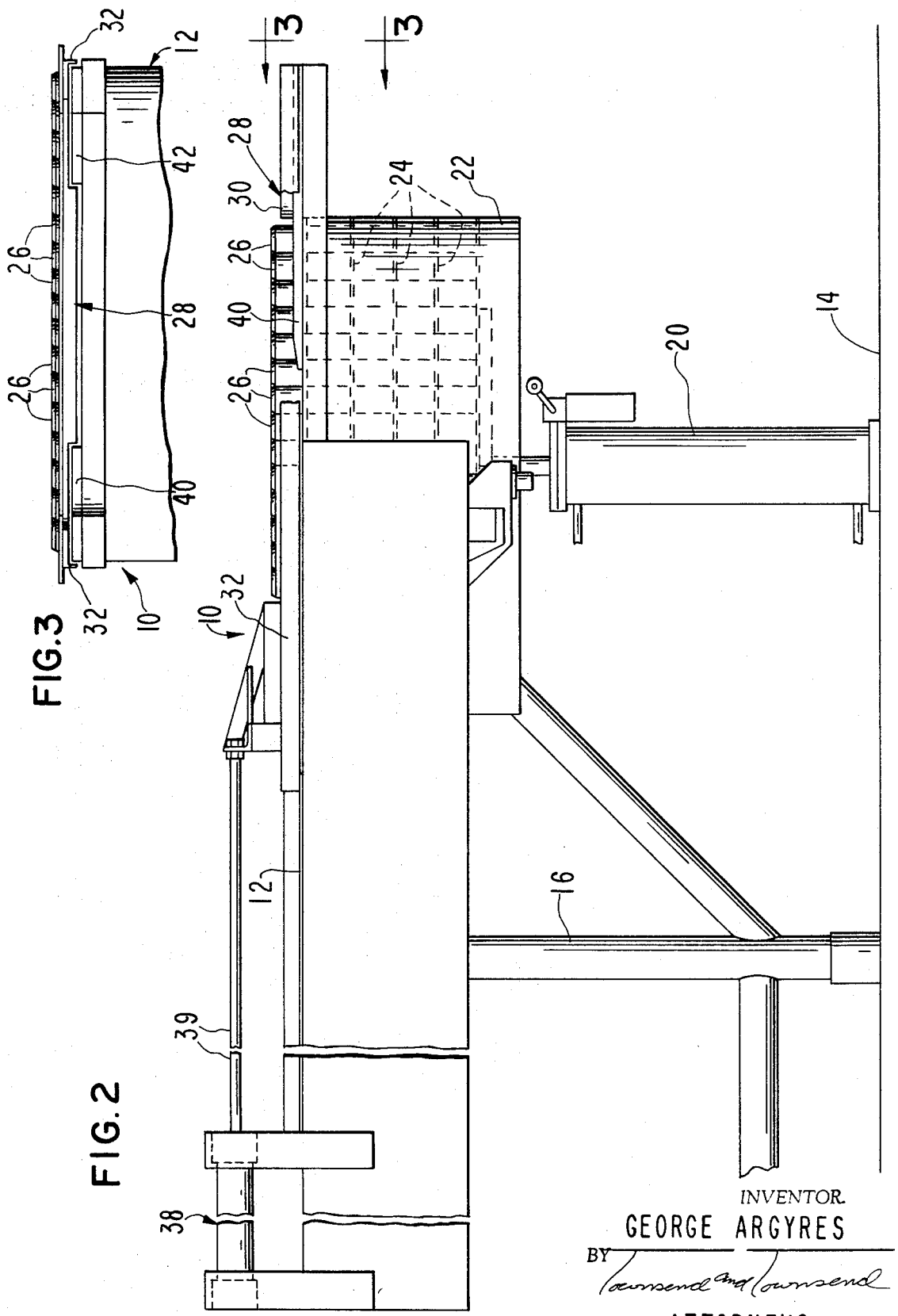

RETORT CRATE UNLOADING APPARATUS

This invention relates to improvements in jar handling equipment and, more particularly, to apparatus for unloading retort crates used to contain stacked layers of food-filled jars or similar articles.

In U.S. Pat. application, Ser. No. 846,838, filed Aug. 1, 1969 and entitled "Machine for Unloading Retort Crates," now U.S. Pat. No. 3,643,823, there is disclosed apparatus for positioning a retort crate containing a vertical shiftable stack of glass jars at a location in which the uppermost layer of jars can be swept laterally of and off the stack and onto a supporting surface. The sweeping means includes a generally U-shaped bail which is mounted for reciprocation along a generally horizontal path and has a pair of parallel sides. A power device is coupled to the bail for reciprocating the same.

As the bail is moved in one direction, its sides first embrace the uppermost layer of jars of a retort crate, then the concave portion of the bail engages the jars and advances the same off the stack and onto the supporting surface. Associated with the bail is a shiftable, curved jaw which partially embraces the lead jars during their initial movement off the stack. The jaw prevents the lead jars from toppling over as the jars behind them bump them from the rear. Otherwise, when the jars topple over, they must be manually placed in upright positions to be properly oriented for further processing, such as being fed through a labeling machine. Toppled jars will jam the entrance to a labelling machine.

The shiftable jaw adds to the cost and maintenance of the unloading apparatus since the jaw and its supporting and shifting structures are complicated in construction inasmuch as the jaw must not only move horizontally during initial movement of the bail but also must thereafter be elevated so that the jars can continue to move uninterruptedly onto the supporting surface. This also means that the jaw must be progressively moved faster than the bail so that it can be quickly elevated without interrupting the travel or the orientation of the jaws themselves. It is, therefore, desirable to eliminate this jaw to simplify the unloading process as well as to reduce costs.

The present invention is directed to improvements in the bail for a retort crate unloading apparatus of the type described and provides a bail whose jar-engaging portion is the reverse of that of the one disclosed in the above-identified patent application. To this end, the improved bail of the present invention has a convex side or face which engages the uppermost layer of jars and advances these jars toward and onto the supporting surface. The bail, as it moves the jars, moves into a location at which it is aligned with the outer peripheral boundary of the circular opening in the table through which the layers of jars are elevated from the retort crate. Stopping the bail at this location assures that the trailing jars, i.e, the jars last to be swept off the stack, will partially surround the opening and be directly adjacent thereto. Thus, these trailing jars will serve as individual abutments for the lead jars of the next layer to be swept off the crate and will prevent these lead jars from toppling over as they are initially swept laterally by the action of the bail. Once the movement of such next layer of jars starts, they will push the first layer further onto the supporting surface and eventually onto a conveyor which can then move the jars toward and into a labelling machine.

Another aspect of the invention is the provision of a pair of fixed abutments near the upstream side of the opening in the table. These abutments prevent the jars, as they are initially swept laterally by the bail, from passing relative to and along the convex side of the bail and into the two side spaces formed in advance thereof because of its convex abutment configuration. Without the abutments, the jars could topple over in these spaces. Thus, the abutments keep the jars upright as they are shifted by the bail.

It is the primary object of this invention to provide an improved retort crate unloading apparatus of the type described wherein the bail has a convex portion for engaging and sweeping a layer of articles carried by the retort crate laterally of the same with the bail stopping at a location in which it positions the trailing jars of the layer in partially surrounding relationship to the opening in the table top so that such trailing jars can serve as abutments for the lead jars of the next layer to be swept laterally by the bail.

Another object of this invention is to provide apparatus of the aforesaid character wherein the jars are prevented from moving along the convex face of the bail as the latter sweeps the jars off onto the supporting surface to thereby prevent toppling of the trailing jars as they might ordinarily do during initial movement of the bail.

Other objects of this invention will become apparent as the following specification progresses, reference being had to the accompanying drawings for an illustration of the improved apparatus.

IN THE DRAWINGS

FIG. 1 is a fragmentary, top plan view of a retort crate unloader, showing the improved bail of this invention;

FIG. 2 is a side elevational view of the unloader of FIG. 1; and

FIG. 3 is an end elevational view of the unloader looking in the direction of line 3—3 of FIG. 2.

A retort crate unloader 10 used to illustrate the teachings of the present invention includes a horizontally disposed table top or plate 12 positioned above a floor 14 (FIG. 2) by a number of vertical legs 16. Plate 12 has one end adjacent to and horizontally aligned with a conveyor 34 and has a central, circular opening 18 therein aligned with an elevating mechanism 20 adapted to support a retort crate 22. The crate is adapted to receive and contain a number of supports 24 for supporting a plurality of empty glass jars 26 or the like in layers. The supports are vertically shiftable within the crate so that mechanism 20 can incrementally elevate the support after the uppermost layer of jars are swept off the stack and onto the upper surface of plate 12. Control means (not shown) is utilized to actuate mechanism 20 so that the stack of jars can be incrementally elevated.

Unloader 10, as so far described, is conventional in construction and is especially adapted for unloading small glass jars which have been filled with baby food or the like and closed by respective metal caps. The jars are initially placed in the crate and the crate is lowered into a retort for further processing of the contents of the jars. Unloader 10 operates to remove the jars automatically from the crate so that the jars can be directed by a conveyor to a station for further processing, such as to a labeling machine, and are then conveyed to a packaging station for placement in shipping containers.

The improvement of the present invention is directed to an arcuate bail 28 having a convex end face 30 adapted to engage the jars 26 of the uppermost layer of the stack in crate 22. The ends of the bail are connected by short bars 29, only one of which is shown in FIG. 1, to a pair of side rails 32 which are parallel with each other and extend longitudinally of plate 12 (FIG. 1), the latter defining a dead plate directly adjacent to conveyor 34. The purpose of the bail is to sweep the upper layers of jars toward conveyor 34 and onto the portion of plate 12 adjacent thereto.

Rails 32 are interconnected by a cross beam 36 and the rails are mounted on plate 12 in any suitable manner for reciprocation with respect to opening 18. In this way, bail 28 can be shifted across and above opening 18 and then returned to its starting position.

A fluid piston and cylinder assembly 38 has a piston rod 39 coupled with cross beam 36 and is carried by beam 37. When assembly 38 is actuated, rails 32 and thereby bail 28 are moved to the left when viewing FIG. 1 and the stroke of assembly 38 is such that bail 28 moves from the full line position of FIG. 1 to the dashed line position. In the dashed line position or downstream position of the bail, convex surface 30 thereof is substantially vertically aligned with the arcuate portion of opening 18 at the downstream end of the opening. Thus, jars 26 advanced by the movement of the bail will stop at an arcuate region extending along the curved, downstream portion of opening 18. These jars, denoted by the numeral 26a in FIG. 1, will form abutments for the leading jars of the next layer so that when such leading jars commence to move toward and onto plate 12, the abutment-defining jars 26 will prevent such leading jars from toppling over due to the initial force applied to the corresponding layer by bail 28.

Since bail 28 is generally symmetrically located with respect to the upstream extremity of opening 18, the rearmost group of jars of the upper layer have a tendency for moving along the bail as the bail moves to the left when viewing FIG. 1. This causes the upstream jars to have a tendency to topple over, thus requiring that the toppled jars be manually placed in upright positions. To eliminate this problem a pair of members 40 and 42 are secured to the upstream end of plate 12 as shown in FIGS. 1 and 2 to present arcuate faces 44 and 46 which are complemental to opening 18 as shown in FIG. 1. Thus, end faces 44 and 46 prevent any side or rearward movement of the jars as bail 28 sweeps the jars to the left or forwardly when viewing FIG. 1.

In operation, unloader 10 first receives a crate 28 filled with a stack of jars 26 on supports 24. The crate is placed on and coupled with mechanism 20 so that, when the latter is first actuated, the uppermost layer of jars moves into the position shown in FIG. 2. In such position, the uppermost support 24 is horizontally aligned with plate 12.

Then assembly 38 is actuated to move bail 28 from its initial position shown in full lines in FIG. 1 to its final position shown in dashed lines in FIG. 1. As the bail moves to the left when viewing FIG. 1, end face 30 engages jars 26 and forces them toward and onto plate 12. During this time, end faces 44 and 46 prevent side and rearward movements of the jars. The jars eventually stop moving when the bail reaches its final position in which surface 30 is substantially vertically aligned with the arcuate, downstream extremity of opening 18.

Bail 28 is then retracted, mechanism 20 is again actuated to move the next layer into alignment with plate 12, and assembly 38 is again actuated to cause bail 28 to sweep the uppermost layer of jars toward and into plate 12. During the second sweep of the jars, jars 26a resulting from the first sweep present abutments to the leading jars of the second sweep, thus assuring that such leading jars will not topple over so as to require manual handling to return them to upright positions. The foregoing process is repeated until crate 22 is completely unloaded. Then the crate is removed and replaced by a full crate of jars.

While bail 28 is described as having a convex face 30, it is to be understood that it could also be constructed with merely a convex leading edge. Also, members 40 and 42 could be in the form of arcuate ribs extending partially about opening 18 rather than be plate-like units as shown in FIG. 1.

I claim:

1. Apparatus for unloading an open top retort crate containing stacked, vertically shiftable layers of articles comprising: means defining a generally horizontal surface having an opening therethrough with an arcuate downstream portion for receiving the upper layer of articles on the retort crate when the latter is aligned with and disposed below the opening; convex bail means mounted above said surface for sweeping the uppermost layer of articles of the retort crate laterally and onto said surface when the retort crate is aligned with the opening, said bail means having a configuration complemental to the downstream portion of the opening; and means coupled with the bail means for moving the same into a location in overlying relationship to said downstream portion of the opening.

2. Apparatus as set forth in claim 1, wherein said bail means comprises a member having a convex, article-engaging portion provided with a pair of opposed ends, and a pair of parallel sides secured to the ends of the member and extending in the direction of travel of the articles.

3. Apparatus as set forth in claim 1, wherein said surface is defined by a dead plate which partially extends around the opening, and a conveyor at the downstream end of the dead plate, the bail means being movable to a position aligned with the portion of the opening directly adjacent to the dead plate.

4. Apparatus as set forth in claim 1, wherein said bail means includes a pair of opposed ends, and including a pair of parallel sides secured to and projecting forwardly from respective ends of the bail, and wherein is included means defining a projection partially surrounding the upstream side of the opening and operable for preventing movement of articles into the regions adjacent to the ends of the bail as the latter sweeps the articles toward said surface.

5. Apparatus as set forth in claim 4, wherein said opening is circular, said projection being arcuate and being complemental to said upstream side of the opening.

6. Apparatus as set forth in claim 5, wherein said projection includes a pair of spaced plates, the plates extending away from and upstream of the opening.

7. Apparatus for unloading an open top retort crate having stacked, vertically shiftable layers of jars therein comprising: a table having a circular opening substantially complemental to said open top of the retort crate and a supporting surface extending laterally from the opening, said table having means therebeneath permitting the crate to move into vertical alignment with the opening to thereby permit the stack of layers to be incrementally elevated to raise the uppermost layer through the opening and into an operative position to be swept laterally and onto the table; an arcuate bail having a pair of opposed ends; a pair of sides secured to respective ends of the bail and extending toward the table on opposite sides of said opening; means shiftably mounting the bail on the table with the convex side of the bail movable from a first position upstream of the opening to a second position aligned with the downstream boundary of the opening, whereby the bail will sweep the uppermost layer of jars laterally of the opening and onto the table; and means coupled with the bail for moving the same from the first position to the second position and return.

8. Apparatus as set forth in claim 7, wherein is included means adjacent to the upstream side of the opening for preventing jars from moving upstream of the opening as the same moves downstream thereof.

* * * * *